United States Patent [19]

Brunn

[11] Patent Number: 4,496,260
[45] Date of Patent: Jan. 29, 1985

[54] DEVICE FOR THE CONNECTION OF TWO STRUTS BY INSERTING A SUPPORT BETWEEN AND VERTICALLY TO THEM

[76] Inventor: Oswald Brunn, Bunzlauer Platz 1, D-8000 Munich 50, Fed. Rep. of Germany

[21] Appl. No.: 414,244
[22] PCT Filed: Dec. 29, 1981
[86] PCT No.: PCT/EP81/00207
§ 371 Date: Aug. 26, 1982
§ 102(e) Date: Aug. 26, 1982
[87] PCT Pub. No.: WO82/02578
PCT Pub. Date: Aug. 5, 1982

[30] Foreign Application Priority Data

Jan. 22, 1981 [DE] Fed. Rep. of Germany ....... 3102027

[51] Int. Cl.³ .............................. F16B 7/22
[52] U.S. Cl. ................... 403/189; 403/253; 403/255; 403/353; 5/294; 5/288; 5/296
[58] Field of Search ............... 5/294, 295, 296, 288, 5/290; 403/353, 189, 187, 253, 254, 255

[56] References Cited

U.S. PATENT DOCUMENTS

| 159,408 | 2/1875 | Grillet ....................... 5/295 |
| 983,093 | 1/1911 | Svenson et al. . |
| 1,945,352 | 1/1939 | Hillstrom et al. ................ 5/294 |
| 2,132,131 | 10/1938 | Schilling ........................ 5/294 |
| 2,246,509 | 6/1941 | Davies ........................ 403/345 |
| 2,247,265 | 6/1941 | Whalen ........................ 411/545 |
| 2,962,170 | 11/1960 | Best ........................ 403/187 X |
| 3,469,865 | 9/1969 | Ellenburg . |
| 3,537,153 | 11/1970 | Ausnit . |
| 4,413,366 | 11/1983 | Whitehead ................... 403/254 X |

FOREIGN PATENT DOCUMENTS

| 29641 | 8/1907 | Austria .......................... 5/296 |
| 7397 | 2/1980 | European Pat. Off. ........... 403/353 |
| 1707634 | 9/1955 | Fed. Rep. of Germany . |
| 1263403 | 3/1968 | Fed. Rep. of Germany . |
| 2510211 | 9/1976 | Fed. Rep. of Germany . |
| 2825408 | 12/1979 | Fed. Rep. of Germany . |
| 2836504 | 2/1980 | Fed. Rep. of Germany . |
| 1129876 | 1/1957 | France . |
| 1222144 | 6/1960 | France . |
| 2181245 | 11/1973 | France . |
| 300421 | 9/1932 | Italy .......................... 5/296 |
| 616993 | 12/1978 | Switzerland . |
| 839660 | 6/1960 | United Kingdom . |

Primary Examiner—Cornelius J. Husar
Assistant Examiner—Joseph A. Fischetti
Attorney, Agent, or Firm—Pollock, Vande Sande & Priddy

[57] ABSTRACT

This is a device for connecting the front ends of two horizontal struts at a post by inserting plates with teeth into slits in the ends of the struts and a plate with pockets into a slit that goes through the post. Such device is useful, for example, for a piece of garden furniture made up from horizontal and vertical parts. The strut plates have protruding wedge shaped teeth that point downward. The post plate has pockets on each side that correspond in shape to the teeth which are inserted therein.

14 Claims, 9 Drawing Figures

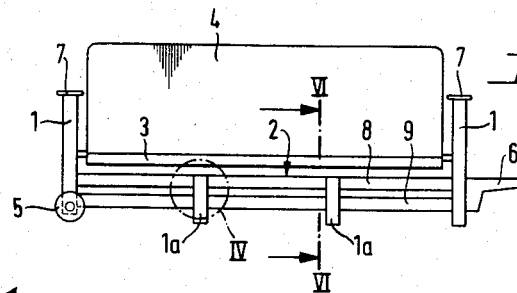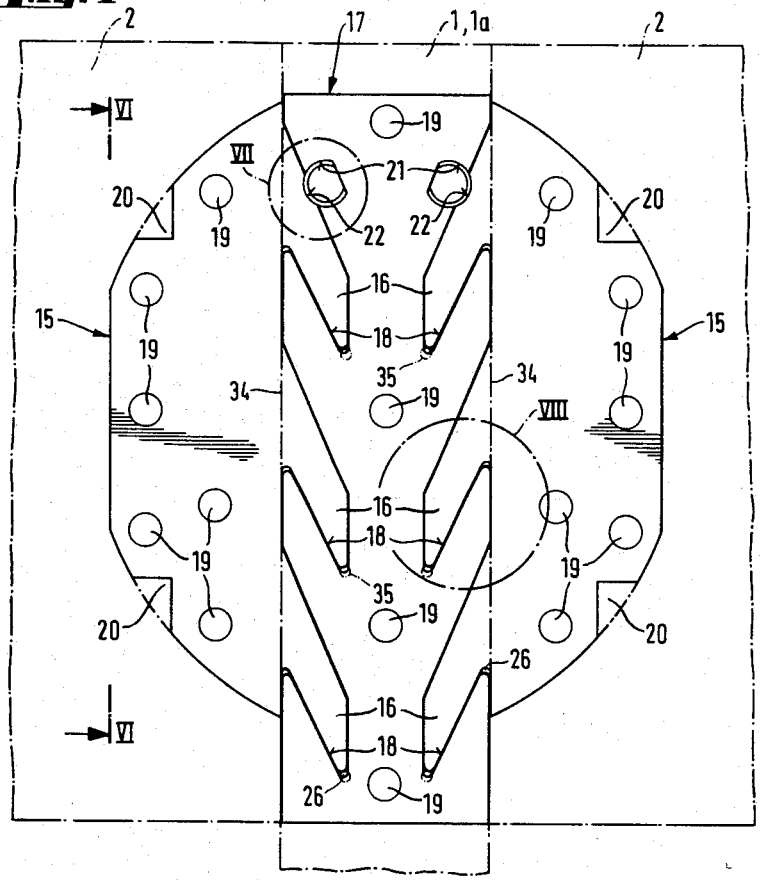

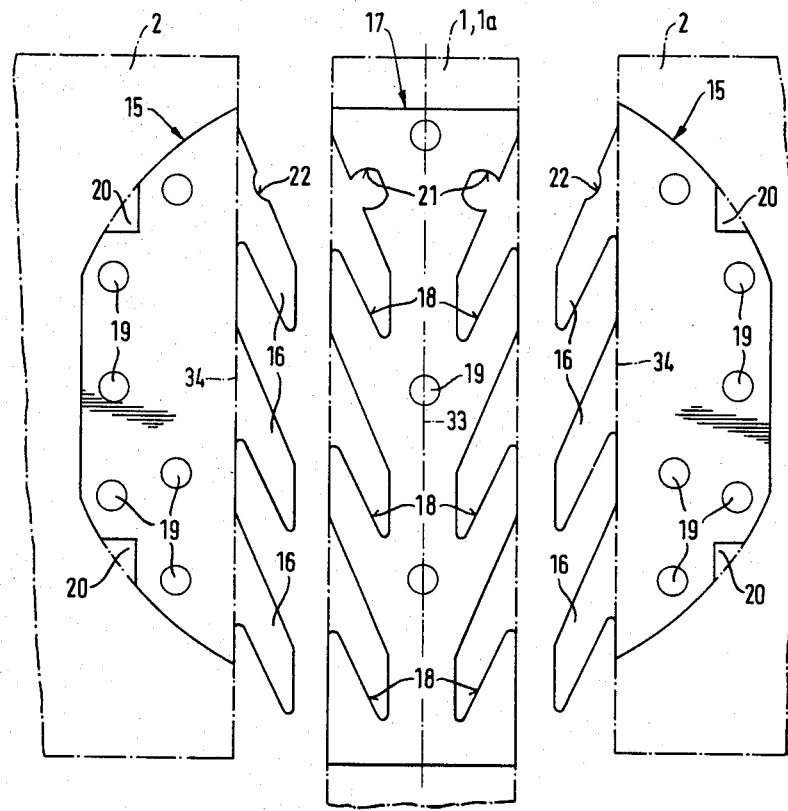

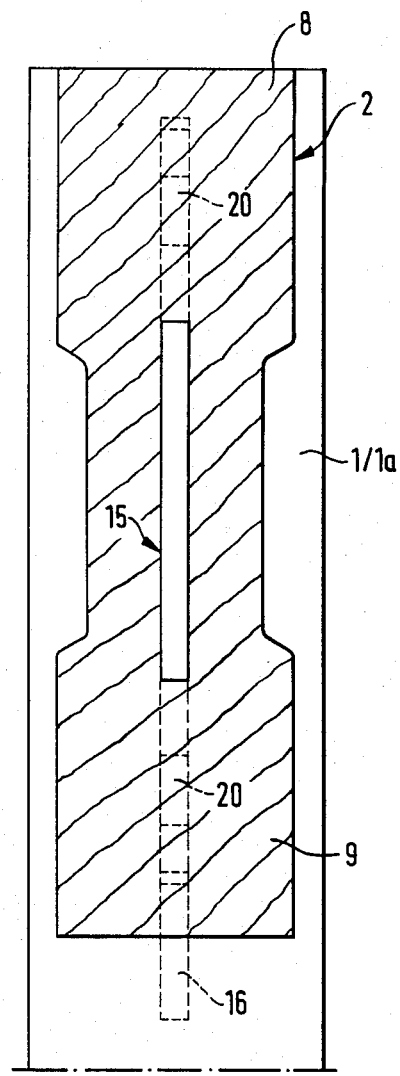

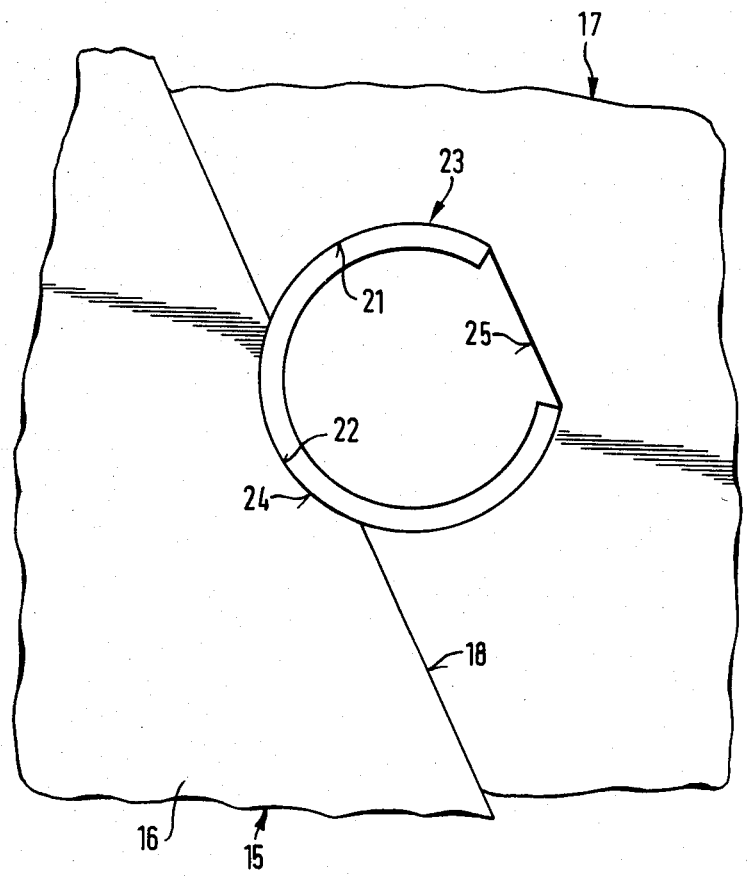

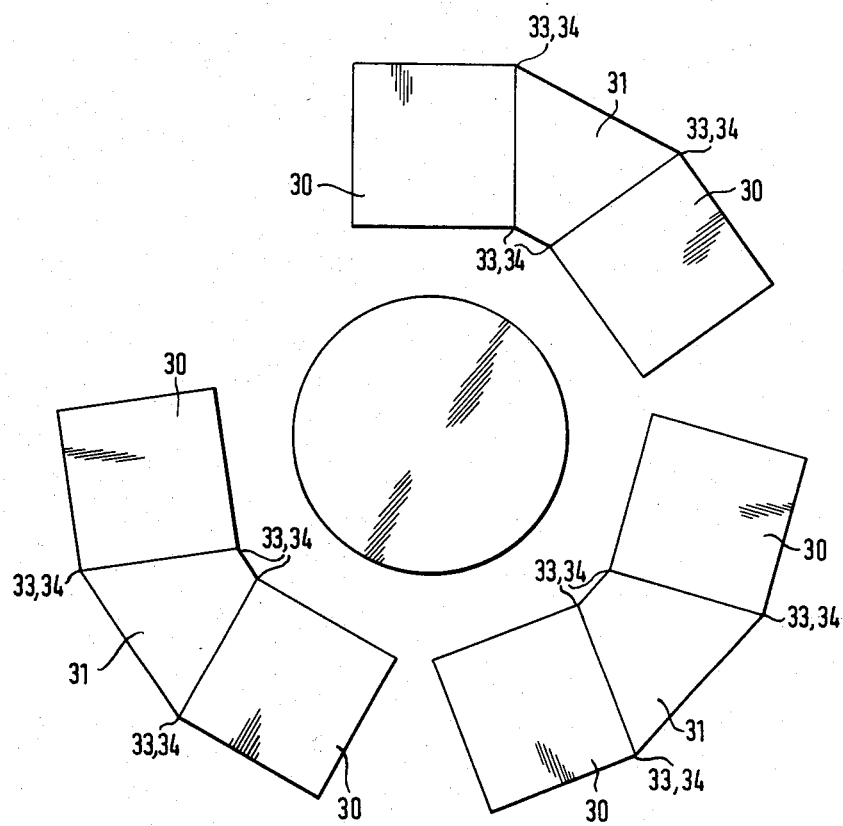

DEVICE FOR THE CONNECTION OF TWO STRUTS BY INSERTING A SUPPORT BETWEEN AND VERTICALLY TO THEM

TECHNICAL FIELD
BACKGROUND OF THE INVENTION

The invention concerns a device to connect the ends of two horizontal struts by inserting a support between and vertically to them.

Such connections are needed, for example, for combination furniture according to DT-OS No. 28 25 408. The known connection for this purpose consists of pegs and screws that are mounted between the struts and posts. Although these connectors can be manufactured in a stable and deformation resistant way, they are, however, relatively complicated to mount and remove. An even simpler connector of this kind would be suitable in order to facilitate the assembly and de-assembly of such furniture, especially for older or handicapped persons. In addition, it has so far been necessary that the adjoining surfaces be relatively large, in order for the front surfaces of the struts not to be pressed into the material of the posts during handling in actual use as this would lead to an inclined position of the posts. For example, movable parts between the posts, as with a back rest, might, in actual use, no longer fit between the posts. However, such relatively large contact surfaces require corresponding cross sections, and therefore a correspondingly large amount of material.

According to CH-PS No. 616 993, plate shaped connectors are inserted into slits on the sections to be connected. In each case a hook on one plate reaches into a hook pocket on the other plate. With such a connector, only two parts can be connected at one time, whereby the transmissible forces are limited. As, in addition, the hook and the hook pocket are rectangular in topview, the connection will be relatively loose even if the connector plates are manufactured with precision, so that the parts could come easily apart accidentally. This danger is even increased by the fact that the upper back surface of each hook is not supported.

Another device to connect two sections with contact sides, especially plates, is known under GB-PS No. 839 660, whereby also strips with slits in them are inserted into grooves on the plates. A coupling part that is put in between, hooks into the slits with lateral wings. In this case, the slits are wider then the wings. One end of the coupling part is threaded, so that a screw can be inserted, the head of which sits against the ends of the two connector strips. This causes the wings to be tightened along their front surface against a front surface of the slit. Because of this, forces on the wings and slits can only be transmitted in one direction, while effective forces in the opposite direction have to be transmitted through the screw connection mentioned above. That means, only two parts can be connected at a time, whereby the transmissible forces are relatively small and the undesirable screw connection is also required.

DISCLOSURE OF INVENTION

In contrast, the invention was based on the problem to create a connector device of the type described in the beginning that would be as simple as possible, easy to operate and, at the same time, very strong, suitable for heavy use, but also easy to disconnect, that is, for the connection of two horizontal struts by inserting a vertical support. The solution of this problem is specified in the characterization part of patent claim 1 and further detailed by the characteristics of the subordinate claims. In the device according to the invention, the teeth and pockets are wedge shaped and coordinated, so that, in a connected position, the upper and lower surfaces or flanks come in contact with each other. These prestressed contact surfaces can transmit relatively large forces whereby the wood or other material is relieved of these forces.

BRIEF DESCRIPTION OF DRAWINGS

To further explain the invention, a practical example will hereafter be described, based on drawings, whereby the connector device according to the invention is used in a piece of garden furniture according to DT-OS No. 28 25 408 stated above.

FIGS. 3 and 4 show in contrast, and in the same manner, the connector device according to the invention, used in such a piece of garden furniture.

FIG. 5 corresponds to FIG. 4, whereby the parts were drawn pulled apart horizontally (or before assembly).

FIG. 6 shows a cross section according to line VI—VI in FIG. 4.

FIG. 7 shows, in a larger scale, the details from line VII—VII in FIG. 4, i.e. one locating device of the connected parts.

FIG. 9 shows, in top view from above, some furniture elements connected to each other at an obtuse angle, using the connector according to the invention.

BEST MODE AND OTHER EMBODIMENTS FOR CARRYING OUT THE INVENTION

Figure 1:
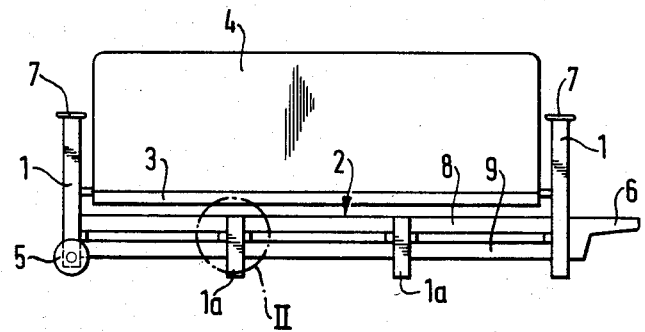
FIG. 1 shows the front view of such a piece of furniture.

As an example, FIG. 1 shows a bench or lounge made of wood that can be moved in a wheelbarrow fashion, and is mainly designed for use in a garden or on a terrace. A basic frame or support is assembled from vertical frames or supports 1 or 1a and horizontal struts 2 that extend between those, to which a three part seat section 3 and a corresponding back rest 4 are attached. On one end of the frame are wheels 5 and on the other end handles 6, so that the piece of furniture can be moved like a wheelbarrow. The end supports 1 are higher than the center supports 1a and carry arm rests 7.

Such a piece of furniture should be as light as possible, and, primarily, the connectors, especially those between the supports 1, 1a and the struts 2, should be sufficiently strong, but, at the same time, simple enough so that the piece of furniture can be assembled and taken apart easily, so that it could, e.g. be stored in winter.

Figure 2:
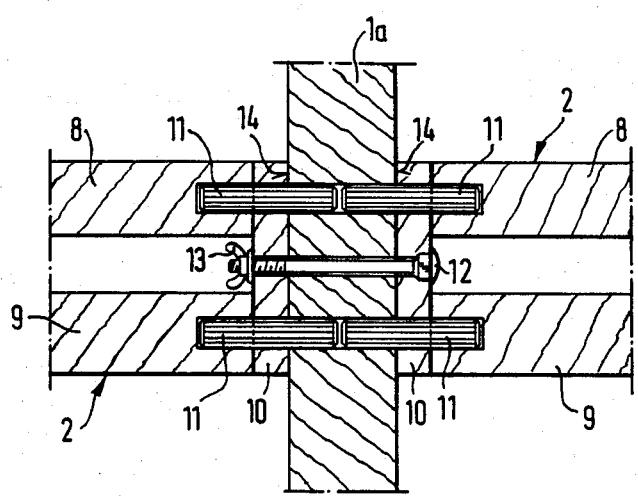
FIG. 2 shows—to be afterwards compared to the invention—the connector that was so far used with such garden furniture, according to FIG. 1.

The connectors that have been used so far for this purpose are shown in FIG. 2. Each horizontal strut 2 consists, like a frame, of an upper cross bar 8 and a lower cross bar 9, each time connected at the end of the vertical piece 10. Pegs 11 are inserted into the corresponding horizontal drillings in the cross bars 8, 9, as well as in the support 1, 1a. The parts that can be assembled in this fashion are held together by bolts 12 and wing nuts 13 inserted into appropriate drillings.

It can be seen that these connections are subject to great stress. This is especially the case if the supports 1a are not, or not sufficiently, in contact with the ground. As a matter of fact, only the end supports 1 should stand on the ground. The contact surfaces 14 shown in FIG. 2 have to support especially much pressure, so that the wood of the struts presses into the supports, which causes the connections to become loose or shaky if these contact surfaces are not large enough.

This danger has bee eliminated with the device according to the invention, which has also the advantage that it can be assembled and taken apart much more easily and without using screws, as will be described below.

As is shown especially in FIGS. 4, 5 and 6, two slits are cut into the ends of the struts, into each of which a plate 15 is inserted with teeth that protrude from the slit and point downward at an angle. There are three teeth 16 in equal distance below each other. Into a slit that goes through each vertical support 1 or 1a, a plate 17 is inserted which has, on either side, pockets 18 that correspond to the teeth 16. Therefore, the teeth 16 of the plates 15 that are firmly mounted into the horizontal struts 2, fit exactly into the pockets 18 of the plates 17 that were inserted into the vertical supports 1, 1a which makes—in the simplest cases—hooklike connections.

The plates 15 and 17 are fastened into the slits with bolts that go through the plates and struts 2 or supports 1, 1a respectively, and positioned exactly in this fashion. In addition, the full surfaces of the plates are glued into the slits. The plates 15 have also cut-in notches 20, where extra glue can collect, so that sufficient glue can be used which improves the sturdiness of the connection.

As cross section FIG. 6 (see also FIG. 3) shows, the invention permits the struts 2 to be made of a single piece, which improves simplicity and also solidity, as a space to insert a connecting screw 12, 13 (see FIG. 2) is not required.

Thanks to this invention, the parts can simply be slipped or hooked into each other. This process is made still simpler by the snap groove connection according to FIG. 7. On the contacting narrow side or back of a tooth 16 on the one hand, and of a pocket 18 on the other hand, a snap element is inserted. That means that on the plate 17, mounted in the support, an essentially circular notch 21 is provided, part of the circumference of which extends into the tooth 16—in an assembled position. An annular spring 23 is inserted into this notch 21 of which the center part 24 of its circumference extends into the corresponding arch 22 of the tooth 16. The flattened out area 25 protects the annular spring 23 against twisting. When the parts are assembled, the protruding part 24 of the annular spring 23 is therefore elastically depressed in order to then lock into the arch 24 on the flank of the tooth 16.

Using the connector according to the invention, the pressure in the upper part of the struts 2—as in the construction process for the furniture in FIG. 1—are no longer transferred from one strut 2 through the contact surface 14 to the support 1 or 1a respectively, through these and through contact surface 14 on the opposite side to the other strut 2, but those contact surfaces 14 rather are relieved of pressure or even free of pressure since the pressure forces are transmitted directly via the front surface or flanks of the teeth 16 and pockets 18 that are hooked into each other. In fact, the pressure forces are transmitted by the upper parts of teeth/pockets 16/18. The traction exerted onto the lower part of the struts 2 is mainly transmitted to the lower parts of teeth 16 or pockets 18, respectively, and not through a screw 12 positioned in the center as shown in FIG. 2.

Figure 8:
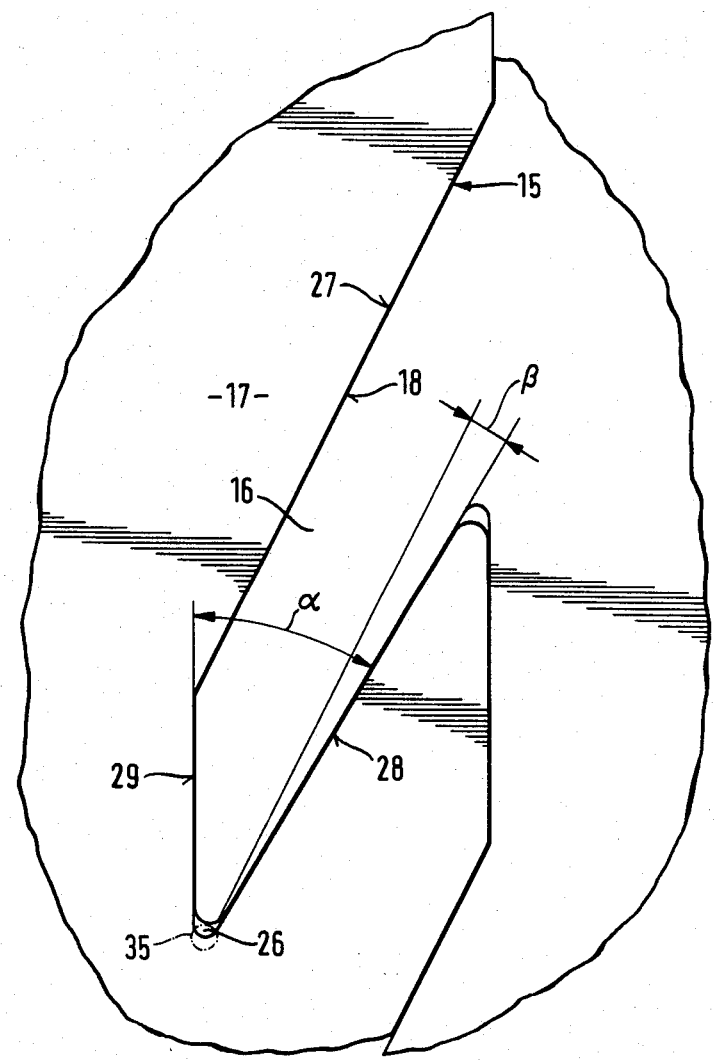
FIG. 8 shows, in a larger scale, the peculiarities of line VIII—VIII in FIG. 4.

The transfer of these forces resulting from the outside loads takes place via the contacting slanting front surfaces or flanks of the teeth 16 or pockets 18 respectively. For this purpose it would be sufficient if these surfaces would be just loosely adjoining in an unstressed state. However with such a loose contact, the connection could disengage inadvertently and such a connection would be altogether too loose (in spite of the snap lock connector according to FIG. 4). It is therefore preferred that the connector according to the invention be made in such a way that the flanks of the teeth 16 and, correspondingly, of the pockets 18 become smaller towards the bottom in a wedge shaped manner, so that the contacting front surfaces or flanks, respectively, are pre-stressed from the start—even in the absence of an outside load. In order for this wedging to take place, the bottom of each pocket 18 is grooved, i.e. the lower end of each tooth is shortened correspondingly, so that a gap 26 remains. An air hole 35 is drilled from the outside through the post ends in this gap 26, or in the bottom of the tooth, through which air hole also dirt can be washed out. As a further refinement, an upper part 27 of the flank of each tooth 16, or each pocket 18, is bent from the lower part 29 at an arcute angle against the opposing flank 28. Besides a wedge angle α of about 30° (FIG. 8) there is therefore also another wedge angle β, though very much smaller, of about 1°. This means that on the same flank two wedge angles are arranged behind each other, i.e. a larger wedge angle α and a very much smaller wedge angle β. The larger part of the pressure will, in each case, be transferred through the lower wedge surface (flank 28), but a part of the pressure will also be transferred through the upper wedge surface 27.

With the old connector according to FIG. 2, the horizontal struts 2 have to be arranged in one and the same line. According to the connector of the invention it is possible that these struts 2 can relatively easily also make contact at an angle of less then 180°, which means that furniture can be arranged at an obtuse angle, as shown in FIG. 9. According to FIG. 9, a small trapezoid shaped table 31 is designed to fit between two chairs 30. In each case, the two chairs and the little table are connected into a unit, three of those units are grouped around a round table. For this purpose, the connector elements are bent accordingly, preferably along the broken symmetry line 33 in FIG. 5. This bending can be done relatively easily in a pressing process. However, the bending of the middle plate 17 can only be relatively slight, as the bent plate has to be inserted into the slit in the support 1, 1a. However, the middle plate 17 can be left straight, and the teeth 16 of the two lateral plates (15) (or only of one of the plates) can be bent, which would be done along broken line 34 in FIG. 4 or FIG. 5, respectively.

Finally, it is possible to make the middle plate 17 considerably wider so that the pockets 18 are not located in the vertical support, but in the horizontal struts, which means that the teeth 16 and pockets 18 do not interlock inside the vertical supports but inside the horizontal struts. Naturally, this connection can be looked at and arranged in such a manner that the teeth 16 are, in a reversed order, attached to the middle plate 17 and correspondingly, the pockets 18 are on the lateral plates 15.

In the preceding an invention has been described in connection with a piece of garden furniture that can be taken apart, such as a seat or lounge, or for table and chair elements. However, there are other applications for the connector according to the invention, as for example shelving. The connector according to the invention is especially suitable if the stress comes from above, i.e. vertically to the lengthwise extension of the struts, and the supports, or at least one support, are (is) not supported.

I claim:

1. A device for connecting the ends of two horizontal struts each in abutment with a corresponding contact surface of a vertical post comprising:
    a pair of strut plates one attached to each of said struts within a slit extending lengthwise along a portion of the strut, each of said strut plates having a first connecting means on an abutting side adjacent to the abutting end of the strut; and,
    a post plate attached to said vertical post and mounted within a slit extending continuously through said post from one of said contact surfaces to the other of said contact surfaces, said post plate having a second connecting means on opposite abutting sides adjacent to where each of said struts abuts said post;
    one of said first and second connecting means comprising at least one tooth extending outward from an abutting side of one of said plates and slanting downward with the upper and lower flanks of said at least one tooth converging in a wedge shape,
    the other of said first and second connecting means comprising at least one pocket extending inward from an abutting side of another of said plates and slanting downward with the upper and lower flanks of said at least one pocket converging in a wedge shape,
    the upper flank of each tooth and the upper flank of each pocket having a lower steeper part and an upper less steep part such that the lower part encloses a relatively large angle and the upper part encloses a comparatively smaller angle relative to the opposing lower flank,
    and the wedge shape and length of each tooth relative to the wedge shape and length of each corresponding pocket providing a gap at the bottom of the pocket adjacent to the lower end of the tooth so that each of the struts abuts the post and the flanks of the tooth are prestressed by contact with the flanks of the pocket when the tooth is wedged into the pocket.

2. A device according to claim 1 which includes pins or bolts for attaching said plates to said struts and said post.

3. A device according to claim 1 in which the portions of said plates inserted into said struts have at least one notch or indented corner, respectively, on their circumference for receiving glue.

4. A device according to claim 1 in which the connecting means with said pocket(s) is within the slit in said post and ventilation apertures are provided in the post and extend to the bottom of said pocket(s).

5. A device according to claim 1 which further includes an elastic snap element for causing elastic engagement between said tooth and said pocket.

6. A device according to claim 5 in which the snap element is made from an annular spring of elastic material, of which the largest part of its circumference is inserted into a notch of the plate(s) containing the pocket so as to prevent twisting and of which, in a locked position, the rest of its circumference snaps into a corresponding notch on the tooth.

7. A device according to claim 1 in which the plate inserted into the post for the connection of the struts is bent at an angle of less than 180° along a center symmetry line.

8. A device according to claim 1 in which, for the connection of the struts at an angle of less than 180°, the at least one tooth of said plate(s) is bent along a bending line going through the tooth base.

9. A device according to claim 1 in which the plates inserted into the struts and the plate(s) inserted into the post are punched out from the same plate of material.

10. A device according to claim 1 in which three teeth and three pockets, respectively, are provided underneath each other on the abutting sides of said plates.

11. A device for connecting the ends of two horizontal struts in abutment with a vertical post comprising:
    a pair of strut plates one attached to each of said struts within a slit extending lengthwise along a portion of the strut, each of said strut plates having a first connecting means on an abutting side adjacent to the abutting end of the strut;
    a post plate attached to said vertical post within a slit extending continuously through said post, said post plate having a second connecting means on opposite abutting sides adjacent to where each of said struts abuts said post,
    one of said first and second connecting means comprising at least one tooth extending outward from an abutting side of one of said plates and slanting downward with the upper and lower flanks of said at least one tooth converging in a wedge shape,
    and the other of said first and second connecting means comprising at least one pocket extending inward from an abutting side of another of said plates and slanting downward with the upper and lower flanks of said at least one pocket converging in a wedge shape, the wedge shape and length of said at least one tooth relative to the wedge shape and length of said at least one pocket providing a gap at the bottom of the pocket adjacent to the lower end of the tooth so that the flanks of the tooth are prestressed by contact with the flanks of the pocket when the tooth is wedged into the pocket; and,
    an elastic snap element for causing elastic engagement between said at least one tooth and said at least one pocket.

12. A device according to claim 11 in which said snap element is made from an annular spring of elastic material, of which the largest part of its circumference is inserted into a notch in the plate(s) containing said at least one pocket so as to prevent twisting and of which, in a locked position, the rest of its circumference snaps into a corresponding notch in said at least one tooth.

13. A device according to claim 11 in which the upper flank of each tooth and the upper flank of each pocket have a lower, steeper part and an upper, less steep part such that the lower part encloses a relatively large angle and the upper part encloses a comparatively much smaller angle relative to the opposing lower flank.

14. A device according to claim 11 in which three teeth and three pockets, respectively, are provided one underneath the other on the respective abutting sides of the post plate and the strut plate, and in which said snap element causes elastic engagement between only one of said teeth and its corresponding pocket.

* * * * *